United States Patent [19]

Shiber

[11] 4,337,672

[45] Jul. 6, 1982

[54] SPEED CHANGING FLOATING POWER TRANSMISSION RING

[76] Inventor: Samuel Shiber, 345 Dunbar Rd., Mundelein, Ill. 60060

[21] Appl. No.: 150,218

[22] Filed: May 15, 1980

[51] Int. Cl.³ .............................................. F16H 55/17
[52] U.S. Cl. ..................................... 74/438; 198/834; 198/835; 254/242; 254/902
[58] Field of Search ................ 254/342, 417, 902; 198/781, 834, 835; 74/438

[56] References Cited

U.S. PATENT DOCUMENTS

| | | | |
|---|---|---|---|
| 386,826 | 7/1888 | Howard | 254/417 |
| 1,067,805 | 7/1913 | Diescher | 198/624 |
| 2,414,134 | 1/1947 | Bartlett | 74/438 X |

FOREIGN PATENT DOCUMENTS 320423 1/1972 U.S.S.R. ................. 198/834

Primary Examiner—C. J. Husar
Assistant Examiner—Conrad Berman
Attorney, Agent, or Firm—Samuel Shiber

[57] ABSTRACT

A floating power transmission ring gear whose inner periphery is supported through its gear mesh with a pinion and whose outer periphery is engaged with a belt, to increase the belt's bending diameter without a corresponding increase in the belt's travel per pinion's revolution.

4 Claims, 3 Drawing Figures

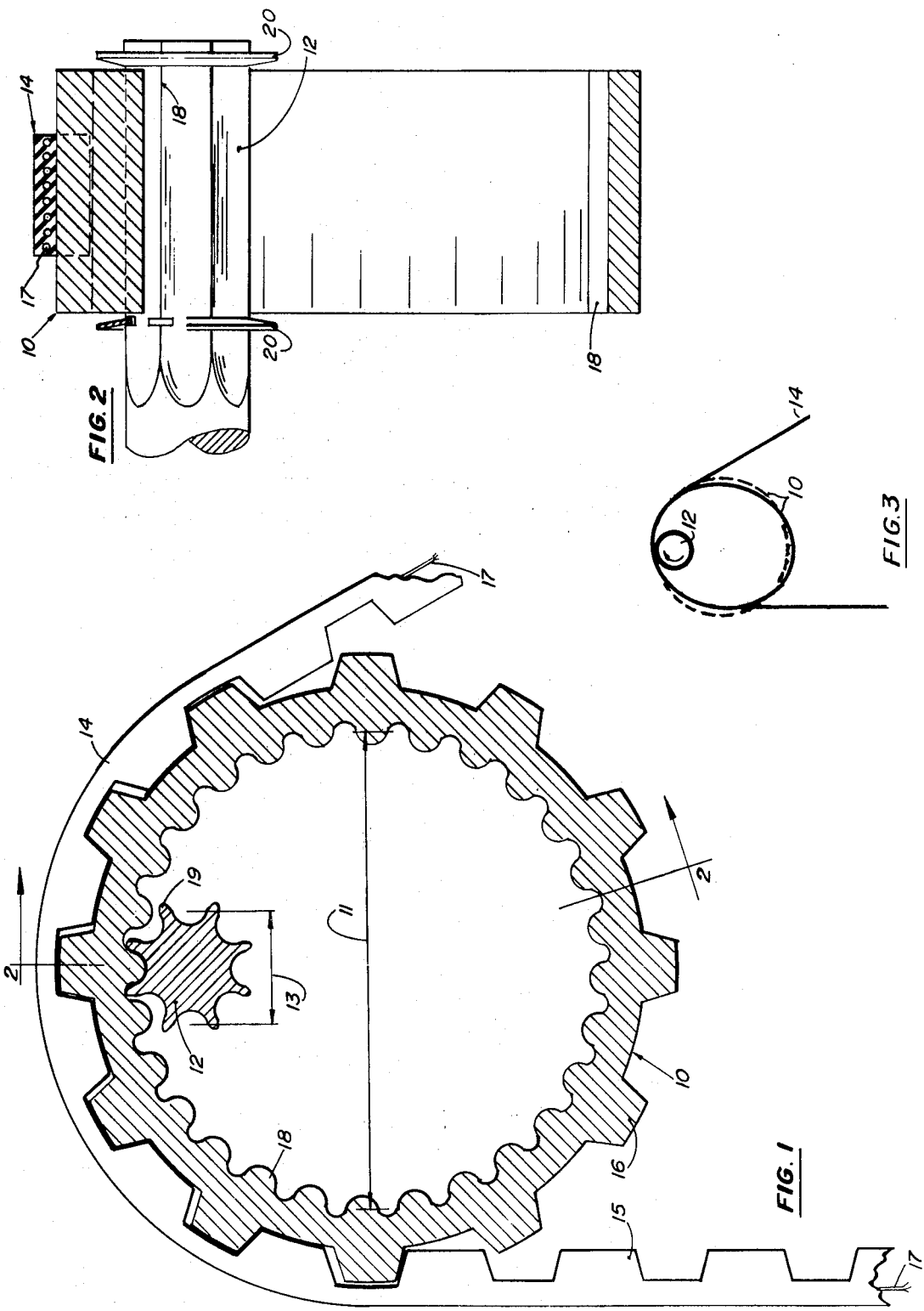

SPEED CHANGING FLOATING POWER TRANSMISSION RING

BACKGROUND OF THE INVENTION

Power transmission belts require a certain minimum diameter of a pulley that they engage in order to prevent excessive wear and/or stress due to bending, and to allow a certain engagement length with the pulley through which power can be transmitted. In some instances, this requirement of a minimal pulley diameter conflicts with a designer's effort to reduce the ratio between the rotational speed of a shaft carrying a drive pulley to the linear speed of the belt (or visa versa in the case of a driven pulley) and it is an object of the present invention to reduce the belt's linear movement per one revolution of the pinion, and to achieve this affect without a reduction of pulley's diameter.

SUMMARY OF THE INVENTION

The present invention comprises a floating, shaftless and bearingless power transmission ring gear having a toothed inner periphery with a first pitch diameter which is engaged with and supported on a pinion gear, having a second pitch diameter which is substantially smaller than the first pitch diameter. The pinion gear supports the ring gear through a gear mesh between them. The ring gear's outer periphery functions as a pulley and is engaged with and supported by belt means, which may be a timing belt, a V-belt some form of a chain or other flexible cord type power transmission means. Since the ring gear is supported between the pinion and the belt means and requires no shaft, bearings or structure to rotatably support it, it is substantially less expensive in comparison with transmissions that it may replace in certain applications.

Further, the ring gear can be manufactured from suitable plastic materials by injection molding or extrusion which contributes to lower the cost of the ring gear itself.

BRIEF DESCRIPTION OF THE DRAWINGS

FIG. 1 shows a cross sectional view of an embodiment of the present invention.

FIG. 2 shows a cross sectional view of the embodiment viewed along line 2—2 marked on FIG. 1.

FIG. 3 shows a schematic layout of the embodiment under load which causes the ring gear to assume an offset position and becomes ovalized for absorbing power surges transmitted through it.

DETAILED DESCRIPTION OF THE DRAWINGS

FIGS. 1 and 2 show an embodiment of the invention comprising a floating power transmission ring gear 10 having an inner pitch diameter 11. The inner periphery is engaged with and supported on a pinion 12 having a second pitch diameter 13, which is substantially smaller than the first pitch diameter 11, therefore, the linear movement of the ring gear 10 and its outer periphery, per a revolution of the pinion, is substantially reduced. The outer periphery is engaged with and supported by a belt means 14. The belt means 14 is illustrated as a belt with teeth 15 which engages with corresponding teeth 16 of the ring 10. The belt is made of an elastomer material such as neoprene or polyurethane and is reinforced by, for example, fiberglass or aramid cables 17. The outer periphery of the ring gear 10 can be fashioned to engage and be warped by other flexible, cord type, power transmission elements such as, for example, V-belts, roller and silent chains which for the purpose of this application will be commonly referred to as "belt means."

The ring's inner periphery carries teeth 18 which are meshed with corresponding teeth 19 carried by the pinion 12.

The teeth system 18 and 19, illustrated in FIG. 1 resemble the type used in roller chains and their sprockets, respectively, that is the teeth 18 are rounded and relatively thick in comparison with the teeth 19 which are narrower. This teeth system 19 is suitable for providing the ring 10 with a radial support while driving it. Further, this geometry of the teeth 18 and 19 is preferable since, due to the different teeth thickness, it lends itself well to systems where the pinion 12 is made of a high strength material such as steel and the ring 10 is manufactured from a preferable softer self-lubricating material, such as plastic for example.

A pair of beveled snap rings 20 guide the ring gear 10 on the pinion 12.

Preferably, as illustrated in FIG. 2, the gear mesh 18/19 is substantially wider than the mesh 15/16 since in the gear mesh 18/19 the full load is carried through a single tooth whereas in the mesh 15/16 several teeth share the load. This wide mesh of teeth 18 and 19 is practical because the mesh carries the radial loads directly and does not require external bearing support. Otherwise, if separate radial load bearing areas where called for, the whole structure would increase in width and both the pinion 12 and the ring gear 10 would have to be thicker reducing the effectiveness of the invention. Further, the resiliency of the ring gear 10 allows it, under load, to "climb" on the pinion and assume an offset position as shown in solid line on FIG. 3 (relative to its position when no load is transmitted through the ring gear 10 shown in broken line on FIG. 3). In the process of assuming the offset portion the ring gear 10 deformes elastically and becomes ovalized, absorbing power surges and shocks transmitted through the system while maintaining proper tension in the belt. It can be understood that the ability of the ring gear 10 to ovalize depends on its elasticity which in turn requires that the ring gear 10 will not have a thick cross section and, with such a ring gear external bearings for radial load would not be effective. Thus, it can be seen how in the present invention, on the one hand, all the design requirements are simultaneously satisfied, and on the other hand how the present invention performs, simultaneously, ratio reduction and shock absorbtion, while requiring minimal and uniquely simple hardware.

It should be appreciated that various modifications and substitutions can be made in the form of the teeth 18 and 19 and in other parts of the design without departing from the spirit of the invention or the scope of the claims.

I claim:

1. A floating power transmission ring gear system comprising in combination:

a floating power transmission ring gear having an inner toothed periphery with a first pitch diameter, said inner periphery is meshed with and supported by a pinion gear having a second pitch diameter substantially smaller than said first pitch diameter, said ring gear has an outer periphery which is engaged with and supported by a belt means, the improvement wherein said ring gear is supported by said pinion gear through the gear mesh between them and serves to reduce the linear movement of said belt means per a revolution of said pinion.

2. The subject matter of claim 1 wherein said gear mesh between said pinion and said ring gear is substantially wider than said belt means.

3. The subject matter of claim 1 wherein said ring gear is made of a plastic material.

4. The subject matter of claim 1 wherein said ring gear is elastic so that under load said ring gear assumes an offset position and becomes ovalized.

* * * * *